June 30, 1964 K. G. BRUCKNER 3,138,997

MOUNTING AND CENTERING DEVICES FOR MILLING CUTTERS

Original Filed Sept. 12, 1955

3 Sheets-Sheet 1

INVENTOR.
KARL BRUCKNER
BY
Thomas O'Michaelis,
Att'y

June 30, 1964 K. G. BRUCKNER 3,138,997

MOUNTING AND CENTERING DEVICES FOR MILLING CUTTERS

Original Filed Sept. 12, 1955 3 Sheets-Sheet 2

INVENTOR.
KARL BRUCKNER
BY
Thomas U Michaelis,
Att'y

INVENTOR.
KARL BRUCKNER
BY
Thomas U Michaelis, Att'y

United States Patent Office 3,138,997
Patented June 30, 1964

3,138,997
MOUNTING AND CENTERING DEVICES FOR MILLING CUTTERS

Karl Georg Bruckner, Haffnerstrasse 7, Stuttgart-Feuerbach, Germany

Continuation of application Ser. No. 533,601, Sept. 12, 1955. This application Aug. 25, 1961, Ser. No. 133,978
1 Claim. (Cl. 90—11)

This invention relates to machine tools, and more particularly to mounting and centering devices for milling cutters and the like.

This application is a continuation of my copending application Serial No. 533,601, filed September 12, 1955, and now abandoned.

It is a primary object of this invention to provide a universal mounting and centering device accommodating a wide range of cutter sizes and designs to a high order of alignment without requiring that the bore of each cutter precisely fit the outside diameter of the machine tool spindle.

It is an equally important object of the invention to provide a universal mounting and centering device especially adapted for accommodating large and largest size cutters.

Another important object of the invention is the provision of a universal mounting and centering device wherein the cutter rigidity, mount stability and centering precision are materially enhanced.

It is a still further object of the present invention to provide an improved mounting and centering device which permits fitting cutters of any desired size, and particularly large cutters, to existing machine tool spindles regardless of their type.

Other objects such as reduced wear, maximum safety, the elimination of many special tools, will become apparent as this specification proceeds.

In the past, it has not been possible to mount and center on machine tool spindles of such diverse types as a standard U.S. spindle head which is cylindrical, or the exterior cone of Brown & Sharpe, for example, milling cutters of all necessary types and sizes which were not specially made for one and only one kind of spindle, as previous attempts at providing for at least some measure of interchangeability of the cutters were doomed to failure owing to such reduced stability of the mount and such reduced centering precision that the result was prohibitive. In consequence of these past failures, it has been necessary all along to provide and stock complete sets of cutter types and sizes adapted for every specific type of spindle, and in view of the high cost of manufacture of such large numbers of relatively complex precision tools, and the equally uneconomical storage and handling requirements thereof, a material simplification by way of a universal mount and centering device adapting cutters of diverse types and sizes for use on the diverse types of spindles, at no reduction of the stability or centering precision of the mount, has been a desideratum of long standing in this art.

In recognition of this pressing problem and in pursuance of the objectives indicated above which include inter alia, the quest for a more satisfactory mount and centering device for large and largest size tools, the present invention contemplates to provide an intermediate member interposed between the machine tool spindle and the cutter and including a flange made to fit precisely over the spindle head. A stud fitting closely bores in the cutter and in the intermediate member, is provided for radially aligning the cutter with the intermediate member and hence with the spindle, and a draw bar is provided which engages the aligning stud for rendering the front face of the cutter perpendicular to the spindle axis by forcing the back face of the cutter securely against the front face of the intermediate member. The plane front face of the intermediate member has a diameter at least substantially equal to that of the flange fitting diameter of the spindle so as to provide a large contact area for the back face of the cutter and the front face of the intermediate member, and this at a large radius with respect to the center axis of the spindle and the intermediate member and cutter mounted thereon.

In the drawings accompanying this specification and forming part thereof, several embodiments of the invention are illustrated diagrammatically by way of example.

Figure 1:
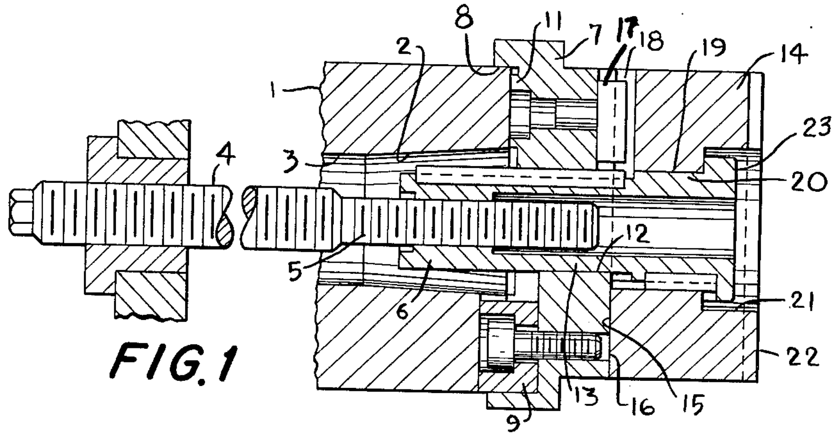
FIG. 1 is an axial section through parts of a machine tool spindle mounting a plain-milling cutter.

Referring to the drawings wherein like elements are indicated by identical reference numerals, and first to FIG. 1, the spindle head 1 of a U.S. standard spindle has a conical bore 2 which extends into a cylindrical bore 3 toward the rear of the spindle. From the rear, a draw bar 4 extends through the bores 3 and 2 to engage, on its screw-threaded head 5, a corresponding thread in the aligning stud 6.

An intermediate member 7 is provided with a cylindrical flange 8 which is machined to close tolerances to precisely fit over the spindle head 1. Driving keys 9 are mounted on the spindle head for engagement of corresponding keyways 10 in the back face 11 of the intermediate member. This arrangement could be reversed, of course, or else the keys and keyways could be arranged partly on one, and partly on the other member.

The intermediate member 7 has a center bore 12 which is traversed by a closely fitting portion 13 of the aligning stud 6.

The tool, in the instance of FIG. 1 a plain-milling cutter 14, rests with its plane back face 15 on the front face 16 of the intermediate member 7, a rotary displacement of the cutter and the intermediate member relative to one another being prevented by keys 17 mounted in the intermediate member and engaging corresponding radial keyways 18 provided on the cutter.

Over much if not most of its depth, the cutter has a center bore 19 which is engaged, with a close interfit, by a corresponding portion 20 on the aligning stud 6 which as shown in FIG. 1, has a materially larger diameter than the portion 13 traversing the center bore 12 of the intermediate member 7.

The center bore 19 in the cutter extends into the recessed, larger diameter bore 21 in the front face 22 of the cutter which is engaged by the head 23 of the aligning stud 6, this head having a materially larger diameter than the portions 20 and 13 of the aligning stud.

It will be observed that when the draw bar 4 tightly engages the aligning stud 6, the front face 22 of the cutter is rendered perpendicular to the spindle axis as the back face 15 of the cutter is forced securely against the front face 16 of the intermediate member 7. It is also observed that the plane front face 16 of the intermediate member has a diameter about equal to that of the spindle head 1 so as to provide a large contact area for the back face 15 of the cutter and the front face 16 of the intermediate member 7, and this at a large radius with respect to the cutter axis of the spindle 1 and the intermediate member 7 and cutter 14 mounted thereon.

Figure 2:
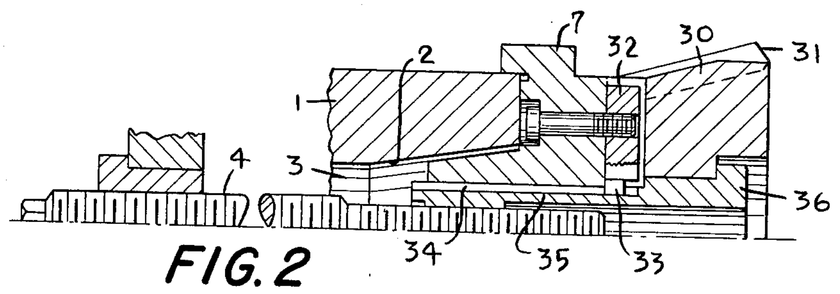
FIG. 2 is a similar showing of the mount and centering device for an inserted blade end milling cutters.

FIG. 2 shows a similar mount and centering device for an end milling cutter 30 having blades 31 inserted therein. This embodiment of the invention corresponds substantially to that illustrated in FIG. 1, except for the provision of a key 32 which has a tooth-like projection 33 engaging a longitudinal keyway 34 provided in the portion 35 of the aligning stud 36.

Figure 3:
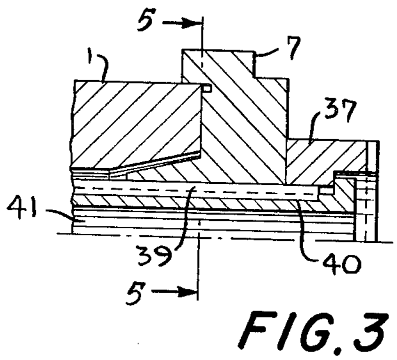
FIG. 3 is a similar showing of the mount for a short cutter head.
Figure 4:
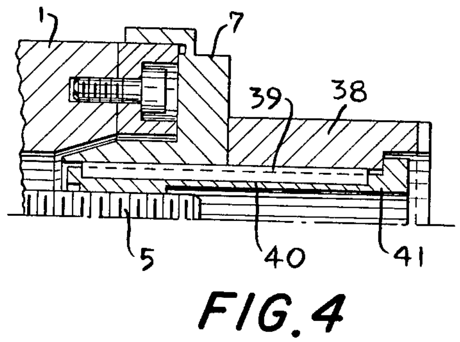
FIG. 4 is a similar illustration of the mount for a long cutter head.
Figure 5:
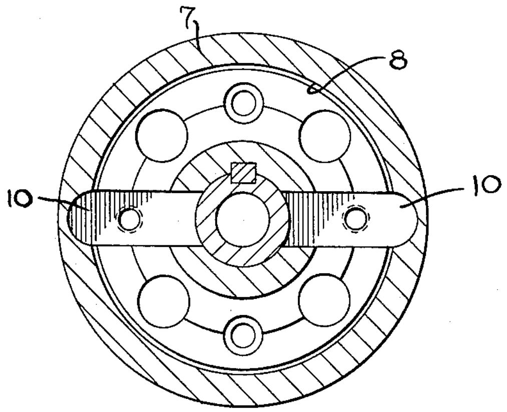
FIG. 5 is a transverse sectional view along line 5—5 in FIGS. 3 and 4.

FIGS. 3, 4, and 5 show similar mount and centering devices for a short cutter head 37 and a long cutter head 38, respectively. In these embodiments of the invention, the tool (head 37 or head 38) is provided with a tooth-like projection 39, and a longitudinal keyway 40 extends along the aligning stud 41 to be engaged by the projection 39 on the tool.

Figure 6:
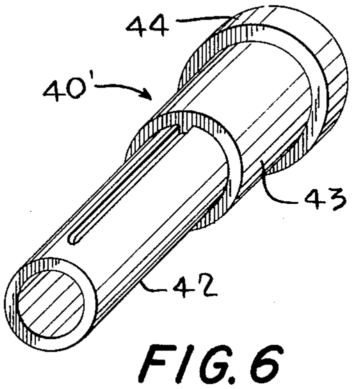
FIG. 6 is a perspective showing of an aligning stud as shown in FIGS. 1 to 4.

The aligning stud as used in the embodiments according to FIGS. 3, 4, and 5 is illustrated in FIG. 6 where 42 is the smallest diameter portion traversing the intermediate member 7, 43 is the larger diameter portion traversing the bore of the cutter (37 or 38), and 44 is the head of the aligning stud 40.

It will be observed that in the embodiments of FIGS. 2 to 5, the front face of the intermediate member 7 has a diameter about equal to that of the spindle head 1 whereby to provide a large contact area for the back face of the cutter and the front face of the intermediate member, and this at a large radius with respect to the center axis of the spindle and the intermediate member and the tool mounted thereon.

Figure 7:
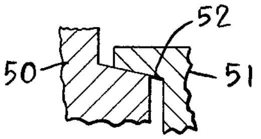
FIG. 7 illustrates an exterior cone type spindle head mounting a device according to the invention.

FIG. 7 shows an exterior cone type spindle head 50 mounting an intermediate member 51 according to the invention. Instead of the usual circular flange, the intermediate member 51 has a cone-shaped flange 52 made to fit precisely over the correspondingly shaped spindle head 50. No tool is shown, as cutters of any kind and size may be mounted on the intermediate member 51 and thereby mounted and centered on the conical spindle head 50 as securely and precisely as on the cylindrical, U.S. standard heads 1 shown in the preceding figures.

Figure 8:
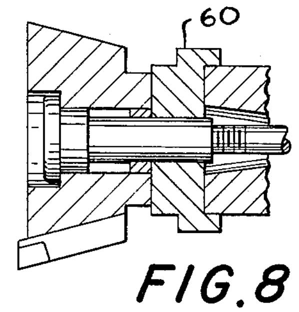
FIG. 8 shows the centered mount of a large cutter on a cylindrical, U.S. standard type spindle head.

FIG. 8 shows the centered mount of a large cutter on a cylindrical, U.S. standard type spindle head, by means of an intermediate member 60.

Figure 9:
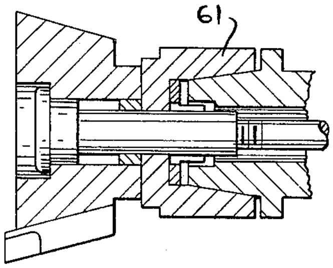
FIG. 9 shows the same cutter mounted on an exterior cone type spindle head.

FIG. 9 shows the same cutter mounted on an exterior cone type spindle head, by means of an intermediate member 61.

Figure 10:
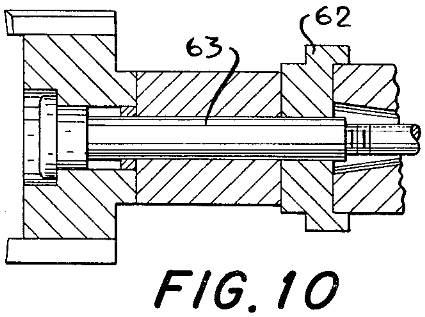
FIG. 10 shows a device according to the invention involving a long intermediate member and a long aligning stud.

FIG. 10 shows a device according to the invention involving a long intermediate member 62 and a long aligning stud 63.

Figure 11:
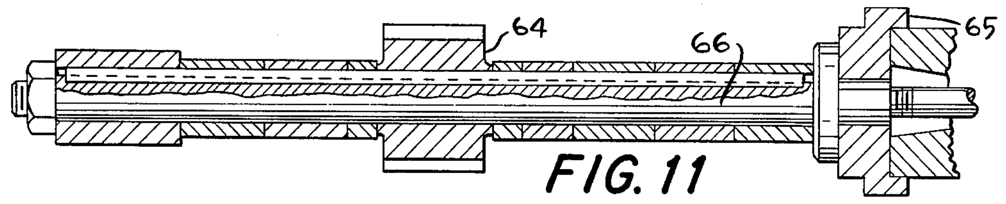
FIG. 11 shows a long cutter arbor mounted and centered by a device according to the invention.

FIG. 11 shows a long cutter arbor 64 mounted and centered by a device according to the invention, including the intermediate member 65 and the aligning stud 66.

It will be observed that the embodiments of the invention according to FIGS. 7 to 11, inclusive, resemble those of the preceding figures in that the front face of the intermediate member has a diameter substantially equal to that of the spindle head, so as to provide a large contact area for the back face of the cutter and the front face of the intermediate member, and this at a large radius with respect to the center axis of the spindle and the intermediate member and the tool mounted thereon.

This large contact area located at a large radius, is an inherent feature of the device of the present invention. The important roles that both the contact area and the radius to the contact area play, not only in cutter rigidity but also with regard to the tensile force required on the draw bar, may be demonstrated by elementary mechanics, reference being had to FIG. 12 wherein an intermediate member A is mounted on the spindle and serves to radially align with the intermediate member and hence with the spindle by an aligning stud B, the cutter C. The front face D of the cutter is rendered perpendicular to the spindle axis by forcing the back face E of the cutter securely against the front face of the intermediate member by means of a draw bar which engages the aligning stud B.

Figure 12:
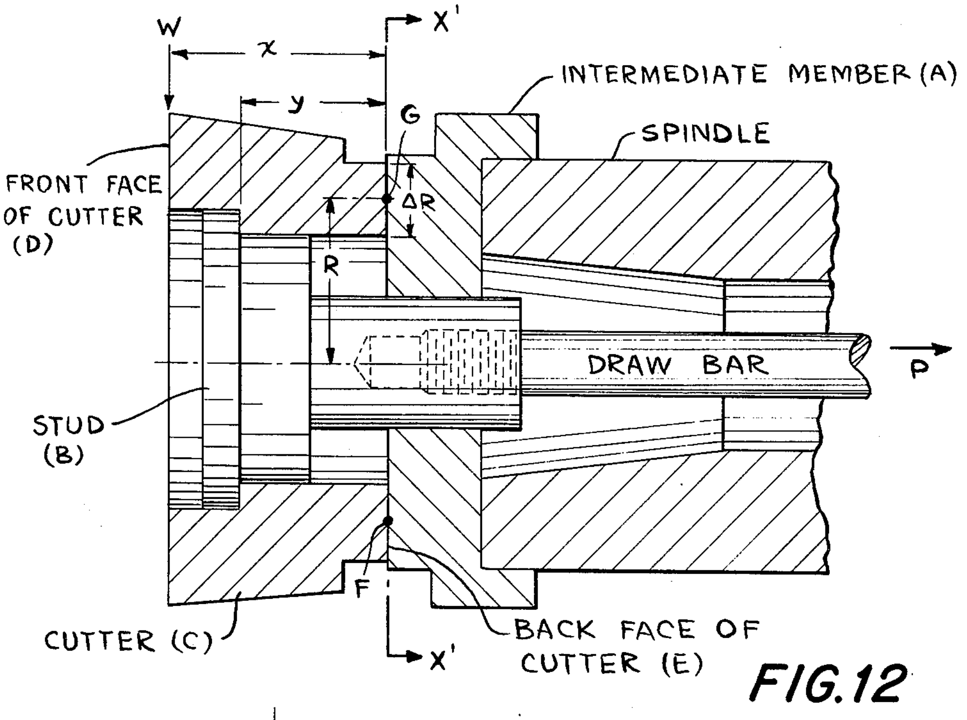
FIG. 12 is a schematic showing of the major elements of a device according to the invention serving to illustrate certain mechanical and dynamical aspects thereof.
Figure 13:
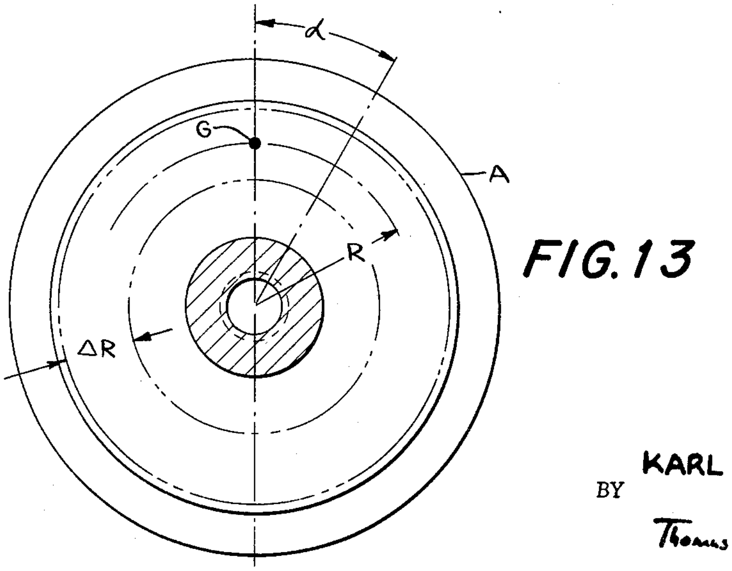
FIG. 13 is a section along line $x^1$—$x^1$ in FIG. 12.

Consider the cutter shown in FIG. 12 as a free body acted upon by a radial cutting force component (W). This force will tend to make the cutter cant counterclockwise with a moment equal to ($x$W) inch pounds. This moment will be resisted by a reduction in the compressive stress at the top of the cutter (G) of ($d\sigma$) and a corresponding increase in the compressive stress at the bottom of the cutter (F) of ($d\sigma$) where ($\sigma$) is the stress induced on the rear face of the cutter (E) by draw bar tensile force (P).

It is evident that before (W) is applied, the stress on face (E) will be uniformly distributed and equal to ($\sigma$) in compression where $$\sigma=\frac{P}{(\Delta R)2\pi R} \qquad (1)$$

When moment ($x$W) is applied, the resisting moment due to the changes in stress on face (E) will be $$4\int_0^{\pi/2}(\Delta\sigma\sin\alpha)(R\sin\alpha)(\Delta R)Rd\alpha=\pi R^2(\Delta R)(\Delta\sigma)$$

where ($\alpha$) is an angle measured circumferentially from the top of the intermediate member (i.e. at G) as shown in section view (X—X) in FIG. 1, and ($\Delta\sigma$) is the change in stress at point G.

For static equilibrium:

$$xW=\pi R^2(\Delta R)(\Delta\sigma) \qquad (2)$$

or $$\Delta\sigma=\frac{xW}{\pi R^2(\Delta R)} \qquad (3)$$

This relaxation of the elastic compressive stress at (G) and the corresponding intensification in stress at (F) will cause the cutter to cant counterclockwise through an angle ($\theta$) where $$\theta\cong\tan\theta=\frac{(\Delta\sigma)y}{ER} \qquad (4)$$

where E is Young's modulus of elasticity ($30\times10^6$ p.s.i. for steel).

Substituting for ($\Delta\sigma$) from (3) into (4):

$$\theta=\frac{xyW}{\pi R^3E(\Delta R)} \qquad (5)$$

One should of course like ($\theta$) to be zero when load (W) is applied, or at least to be as small as possible. The first and most obvious reason for this lies in the fact that one does not wish the depth of the cutter to vary with the applied load (W) in a static way. However, the magnitude of the statical change in $\theta$ (and hence of the depth of cut) with change in (W) is relatively small. The point of real importance lies in the fact that the change of $\theta$ with W (i.e. $d\theta/dw=xy/(\pi R^3\Delta RE)$ from Eq. 5) has the character of a spring constant that is not as stiff as one should like it to be from a dynamical point of view. Unless this spring constant is sufficiently high, it may operate in conjunction with the mass of the cutter to produce a self-excited rotational vibration which will cause the depth of cut to vary periodically and produce a surface roughness whose amplitude can be far greater than the statical deflection of the cutter under load (W). The surest way to avoid such self-excited vibrations, when heavy cuts are taken with large cutters, lies in the provision of a value for $(d\theta/dW)$ that is as small as possible and a cutter mass that is as large as possible.

The quantity $(d\theta/dW)$ is seen to vary—

(1) Inversely as the cube of the radius to the contact area (R).

(2) Inversely with the radial extent of the contact zone ($\Delta$R).

The minimum force required on the draw bar (P) must be sufficient to keep the compressive stress at (G) from going to zero (otherwise contact at G will be lost) when load (W) is applied. Thus, the minimum required value of (P) is such that ($\sigma$) in Equation 1 is equal to ($\Delta\sigma$) in Equation 3 or $$\frac{P_{\min}}{(\Delta R)(2\pi R)}=\frac{xW}{\pi R^2(\Delta R)} \tag{6}$$

or $$P_{\min}=\frac{2xW}{R} \tag{7}$$

It is thus evident that the draw bar tension required varies inversely with the radius to the contact area between the cutter and the intermediate member.

The mean redius (R) to the contact area between cutter and intermediate member is thus seen to be extremely important in two ways:

(1) It provides greater rigidity against elastic deflections imposed by a radial load (W) in proportion to the cube of (R).

(2) It reduces the required tension in the draw bar in proportion to the first power of (R).

The area of contact between the cutter and the intermediate member ($2\pi R\Delta R$) is also important as may be seen in Equations 5 and 7. Both ($\Delta$R) and (R) should preferably be as large as possible, but of these two quantities that contribute equally to the area (Area$=2\pi R\Delta R$) it is more important that R be large than that $\Delta$R be large.

It will be appreciated on the basis of the above analysis that the mounting and centering devices according to the invention provide both a large value of contact area and a large value of radius (R).

The present invention results in signal advantages. Present demands for thrust of a high order to yield milled surfaces of great precision, can be met owing to the singularly force-locking and non-vibratory mount and ultimate precision centering of the tools, by the devices of this invention. Equally, if not more important is the adaptation of existing machine tools to present day requirements, the material reduction in complex high precision tools required for use on diverse machines, and the increased life span of the tools mounted and centered in accordance with the invention. The enhanced utility of existing machines, the simplified exchange of tools, the material reduction in first cost and the equally important saving in storage space are additional advantages resulting from the invention.

I wish it to be understood that I do not desire to be limited to the details of construction, design and operation shown and described except as indicated in the following claim as numerous modifications involving no departure from the spirit of the invention nor any sacrifice of the advantages thereof will readily suggest themselves to persons skilled in this art.

I claim:

In a milling machine accommodating one of a plurality of cutter heads varying widely in diameter and size for engagement with either a cylindrical or conical rotating spindle, the axially joined, rigidly stable combination of an elongated, axially bored spindle having a front face perpendicular to the spindle axis, an axially bored cutter head, and an axially bored mounting collar having front and rear faces parallel to each other and perpendicular to the collar axis, said collar being rigidly fitted between the front face of the spindle and the back face of the cutter, said collar having a front planar face of a diameter at least equal to the outside diameter of the spindle and further having a partially inwardly bored rear face whose configuration is substantially that of the front end of the spindle with the inner rear counterbored surface of said collar receiving a predetermined length of the front end of said spindle in close fitting engagement, the inner length of the counterbored rear face of the collar constituting the sole means on said collar for centering the collar on said spindle, a draw bar extending along substantially the entire length of the center bore of said spindle, said draw bar being threaded at its front end, and an internally threaded stud fitted within the axial bore of the collar and extending through the bore of said cutter, said stud receiving the threaded front end of said draw bar and constituting the sole tensioning means, the length of said mounting collar forward of said spindle being smaller than the radius of the spindle and thereby having at said length a sufficient strength to withstand the compressive stress induced in said collar by said draw bar and stud, whereby the tightening of said draw bar in said stud transmits stress along the entire length of the spindle thus providing an enduring clamping action which prevents transverse rocking motion of said cutter in relation to said spindle even during use in the presence of extreme vibrations.

References Cited in the file of this patent

UNITED STATES PATENTS 2,361,324 Severson ---------------- Oct. 24, 1944

FOREIGN PATENTS 247,281 Switzerland -------------- Dec. 1, 1947